(12) United States Patent
Pennington, II et al.

(10) Patent No.: US 8,922,479 B2
(45) Date of Patent: *Dec. 30, 2014

(54) TEXT INPUT WINDOW WITH AUTO-GROWTH

(75) Inventors: Ernest L. Pennington, II, Issaquah, WA (US); Adrian James Garside, Sammamish, WA (US); Jeffrey West Pettiross, Seattle, WA (US); Shawna Julia Davis, Seattle, WA (US); Tobiasz Alexander Zielinski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/465,495

(22) Filed: Aug. 18, 2006

(65) Prior Publication Data

US 2007/0005670 A1    Jan. 4, 2007

Related U.S. Application Data

(63) Continuation of application No. 10/704,127, filed on Nov. 10, 2003, now Pat. No. 7,106,312.

(51) Int. Cl.
*G09G 5/00* (2006.01)
*G06F 3/033* (2013.01)
*G09G 5/08* (2006.01)
*G06F 3/02* (2006.01)
*G06F 3/0488* (2013.01)

(52) U.S. Cl.
CPC .................. *G06F 3/04883* (2013.01)

USPC ........... 345/156; 345/157; 345/160; 345/165; 345/167; 345/168; 345/170; 345/172

(58) Field of Classification Search
USPC ......................................... 345/156
See application file for complete search history.

(56) References Cited

U.S. PATENT DOCUMENTS

| 4,663,615 A | | 5/1987 | Hernandez et al. |
| 5,406,307 A | | 4/1995 | Hirayama et al. |
| 5,500,937 A | * | 3/1996 | Thompson-Rohrlich ..... 715/764 |

(Continued)

FOREIGN PATENT DOCUMENTS

| EP | 0457990 A2 | 11/1991 |
| EP | 0949559 A1 | 10/1999 |

(Continued)

OTHER PUBLICATIONS

David Goldberg, et al., "Stylus User Interfaces for Manipulating Text", UIST'91, Nov. 11-13, 1991, pp. 127-135.

(Continued)

*Primary Examiner* — Stephen Sherman
*Assistant Examiner* — Andre Matthews
(74) *Attorney, Agent, or Firm* — Dave Ream; Doug Barker; Micky Minhas

(57) ABSTRACT

A user input panel dynamically expands to accommodate user input, such as handwritten or keyboard input. Expansion may occur in one or two out of four possible directions, depending upon the language to be written or typed. For example, when writing English words, the input panel may expand to the right as the user writes and then downward when the input panel has fully expanded rightward.

13 Claims, 12 Drawing Sheets

(56) References Cited

U.S. PATENT DOCUMENTS

| | | | |
|---|---|---|---|
| 5,559,942 A * | 9/1996 | Gough et al. | 715/802 |
| 5,969,706 A | 10/1999 | Tanimoto et al. | |
| 6,061,695 A | 5/2000 | Slivka et al. | |
| 6,133,914 A | 10/2000 | Rogers et al. | |
| 6,288,702 B1 | 9/2001 | Tachibana et al. | |
| 6,295,372 B1 | 9/2001 | Hawkins et al. | |
| 6,525,734 B2 | 2/2003 | Sato et al. | |
| 7,068,288 B1 * | 6/2006 | Good et al. | 345/619 |
| 7,106,312 B2 * | 9/2006 | Pennington et al. | 345/179 |
| 7,423,659 B1 * | 9/2008 | Pratley et al. | 345/660 |
| 2002/0030634 A1 | 3/2002 | Noda et al. | |
| 2003/0001899 A1 | 1/2003 | Partenan et al. | |
| 2003/0016253 A1 * | 1/2003 | Aoki et al. | 345/863 |
| 2003/0020733 A1 | 1/2003 | Yin | |
| 2003/0025715 A1 | 2/2003 | Graham et al. | |
| 2003/0107607 A1 * | 6/2003 | Nguyen | 345/863 |
| 2004/0001051 A1 * | 1/2004 | Tomizawa et al. | 345/173 |
| 2004/0095314 A1 | 5/2004 | Nakagawa et al. | |
| 2004/0193621 A1 | 9/2004 | Moore et al. | |
| 2004/0218216 A1 * | 11/2004 | Ito et al. | 358/1.18 |
| 2004/0230599 A1 | 11/2004 | Moore et al. | |
| 2004/0230917 A1 | 11/2004 | Bales et al. | |
| 2005/0024341 A1 * | 2/2005 | Gillespie et al. | 345/173 |

FOREIGN PATENT DOCUMENTS

| | | |
|---|---|---|
| EP | 1146416 A2 | 10/2001 |
| EP | 1443395 A2 | 8/2004 |
| JP | 01195527 | 7/1989 |
| JP | 04310173 | 2/1992 |
| JP | 06325211 | 11/1994 |
| JP | 08016313 | 1/1996 |
| JP | 08185479 | 7/1996 |
| JP | 08235119 | 9/1996 |
| JP | 09212304 | 8/1997 |
| JP | 10105362 | 4/1998 |
| JP | 2000194464 | 7/2000 |
| JP | 01042992 | 2/2001 |

OTHER PUBLICATIONS

International Search Report of PCT/US05/27258 dated Feb. 24, 2006.
Written Opinion of PCT/US05/27258 dated Feb. 24, 2006.
European Search Report in Application No. 047766175-2211/1682965 PCT/US2004019111, dated Jan. 4, 2011, 4 pages.
Microsoft Excel Introductory Course Course Notes, Jan. 1, 1997, pp. 1-60, XP007908020, URL:http://www.richmond.ac.uk/downloads/it/av/training/97INTRXL.pdf.
Excel 97 Word Wrap, Jan. 1, 1997, XP007908175, 8 pages.

* cited by examiner

TEXT INPUT WINDOW WITH AUTO-GROWTH

CROSS-REFERENCE TO RELATED APPLICATIONS

This application is a continuation application of U.S. patent application Ser. No. 10/704,127, filed Nov. 10, 2003, which is hereby incorporated by reference as to its entirety.

FIELD OF THE INVENTION

Aspects of the present invention are directed generally to improved user input interfaces in computer systems, and more particularly to providing an input panel that dynamically expands on an on-demand basis as the user writes or types.

BACKGROUND

User input devices and interfaces have been growing rapidly to meet the demand of new types of computing devices. More recently, tablet-based personal computers and handheld computers have become popular. These devices typically have a writing surface that converts movement of a stylus across the surface into electronic ink. This ink can be recognized and converted into text, or can be stored in an electronic ink format.

For example, the Microsoft WINDOWS brand XP Tablet PC Edition operating system provides a data entry user interface, sometimes referred to as the text input panel, the Tablet PC input panel or "TIP," through which a user can employ a stylus to enter data into a computer. This type of user interface falls into the broader category of data entry graphical user interfaces, and may be referred to as a data input panel. Some data input panels also may provide a "soft" keyboard surface that displays the characters of a conventional keyboard. If the user employs a stylus to tap on the display of a key with this type of keyboard, then the computer will receive the character associated with that key as input data. Other types of data input panels may have specialized input surfaces. For example, some user interfaces may provide a plurality of letter-sized writing surfaces for receiving characters in an East Asian alphabet as input.

While these types of data input panel increase the usefulness of computers that employ a stylus input device, there are still some inconveniences associated with conventional data input panels. For instance, data input panels are generally specifically invoked by a user in a manner that is difficult or inconvenient. In order to enter data into an application using a data input panel, the user manually activates the data input panel from outside of the application. Many computer users are unfamiliar with data input panels, however, and may overlook or not know how to invoke this resource, rendering such a resource effectively "hidden" from the novice user.

Additionally, because the data input panel is a graphical user interface invoked separately from the application, it typically is displayed separately from the application as well. In some situations, the user interface may be overlaid onto the displayed application itself. While this arrangement allows the user to enter data close to its destination in the application, the user interface may inadvertently obscure the destination or adjacent destinations. Even if the user interface does not initially obscure a desired destination for entered data, however, the user may need to constantly relocate the user interface as new data is entered into the application, to prevent the user interface from obscuring the new insertion points for that data. With still other types of data input panels, the user interface may be "docked" in a space below the application. While positioning the data input panel in this fashion ensures that it will not prevent the user from viewing a desired destination for new data, it is inconvenient for the user to continuously move the stylus back-and-forth between the application and the data input panel to both control the application and enter data into the application.

SUMMARY OF THE INVENTION

Aspects of the present invention allow a user to easily and efficiently enter user input in a way that is less intrusive. An input panel is provided that may be easily discoverable by the novice user and may require little manipulation on the part of the user to be effectively used. The input panel may provide easier access to handwritten input, keyboard input, and other user input when and where needed by the user, while possibly reducing the likelihood of obscuring certain important displayed elements that may be of interest to the user.

Further aspects of the invention are directed to causing an input panel to appear in a convenient location and to dynamically expand to accommodate the user input. The input panel may expand in one or two directions, such as rightward and downward, without expanding in the other two directions (upward and leftward). This may be particularly useful where a language such as English is written or typed into the input panel, for example where the language is likewise written rightward in a horizontal row and then downward in succeeding rows. The direction(s) that the input panel expands may depend upon the chosen language.

According to a further aspect of the invention, the input panel may expand in a way that respects certain defined margins. For example, the input panel may expand only up to a certain margin distance away from an edge of a display. This may protect the availability of often useful user interface elements near the edges of the display.

Still further aspects of the invention are directed to convenient and intuitive summoning and dismissal of the input panel, while reducing the probability that an uninvited input panel will appear or that a desired input panel will inadvertently disappear.

These and other aspects of the invention will become apparent to one of ordinary skill in the art upon a reading of the following description, drawings, and the claims.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

General Computing Environment

Figure 1:
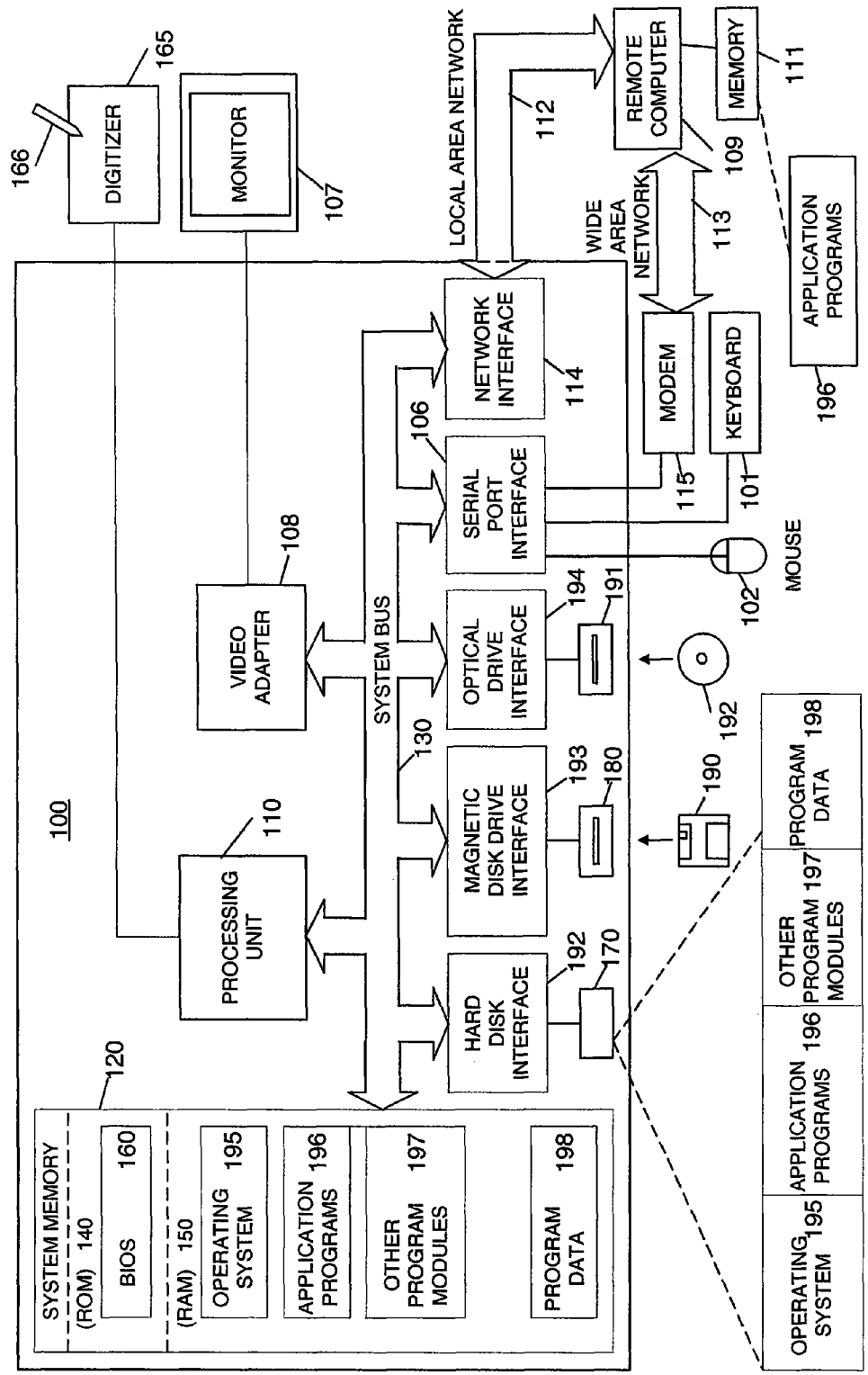
FIG. 1 is a functional block diagram of an illustrative computing environment that may be used in accordance with at least one aspect of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a remote web-based server. Any of various conventional web browsers can be used to display and manipulate data on web pages.

Figure 2:
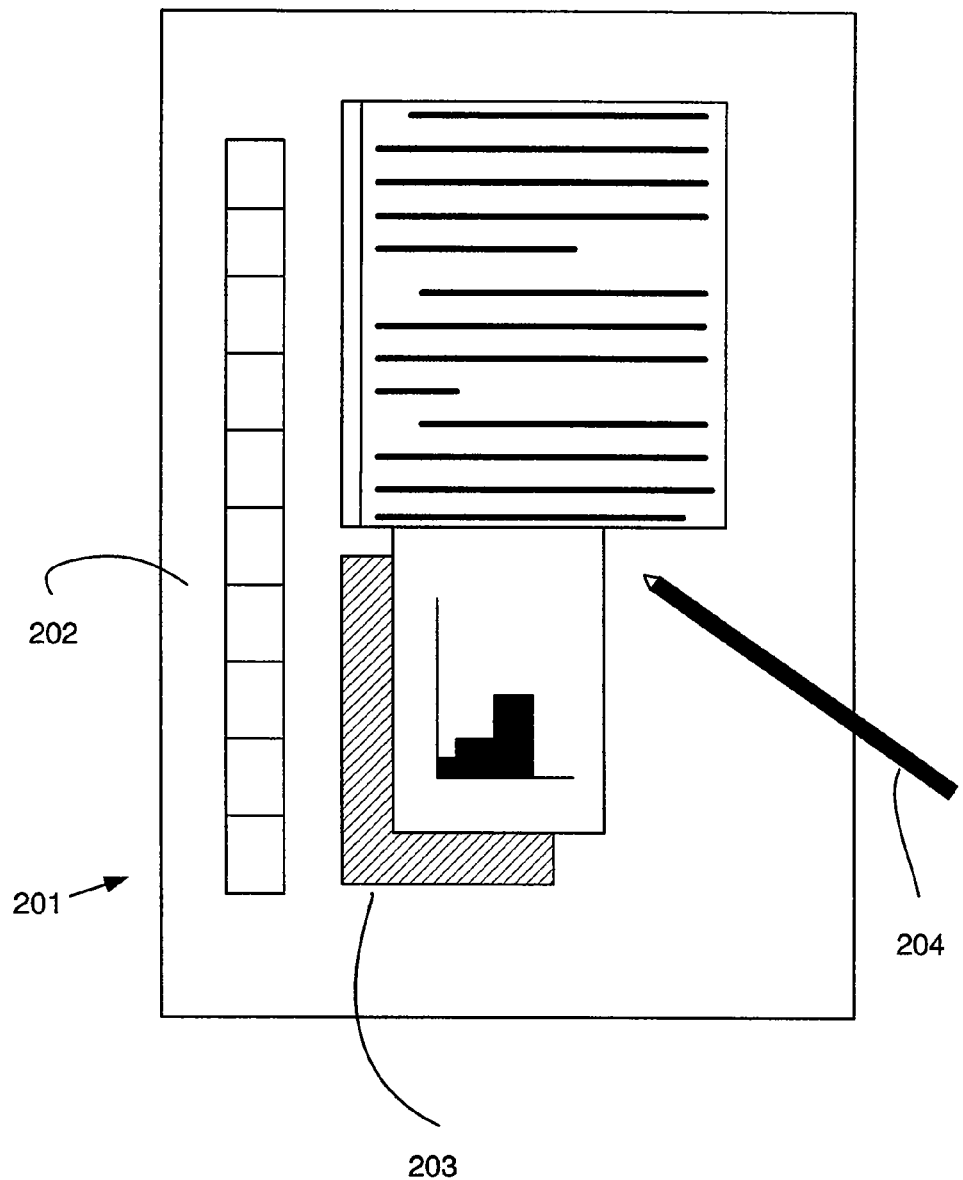
FIG. 2 is a plan view of an illustrative computing environment that may be used in accordance with at least one aspect of the present invention.

FIG. 2 shows an example of a stylus-based computer processing system (also referred to as a tablet PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) or OLED screen, plasma display and the like, on which a plurality of windows 203 is displayed. Using the tip of a stylus 204 (the tip also being referred to herein as a "cursor"), a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

The stylus 204 may be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive and/or proximity-sensitive display. Consequently, the term "user input device", as used herein, is intended to have a broad definition and encompasses many variations on well-known input devices.

Input Panel Expansion Behavior

Figure 3:
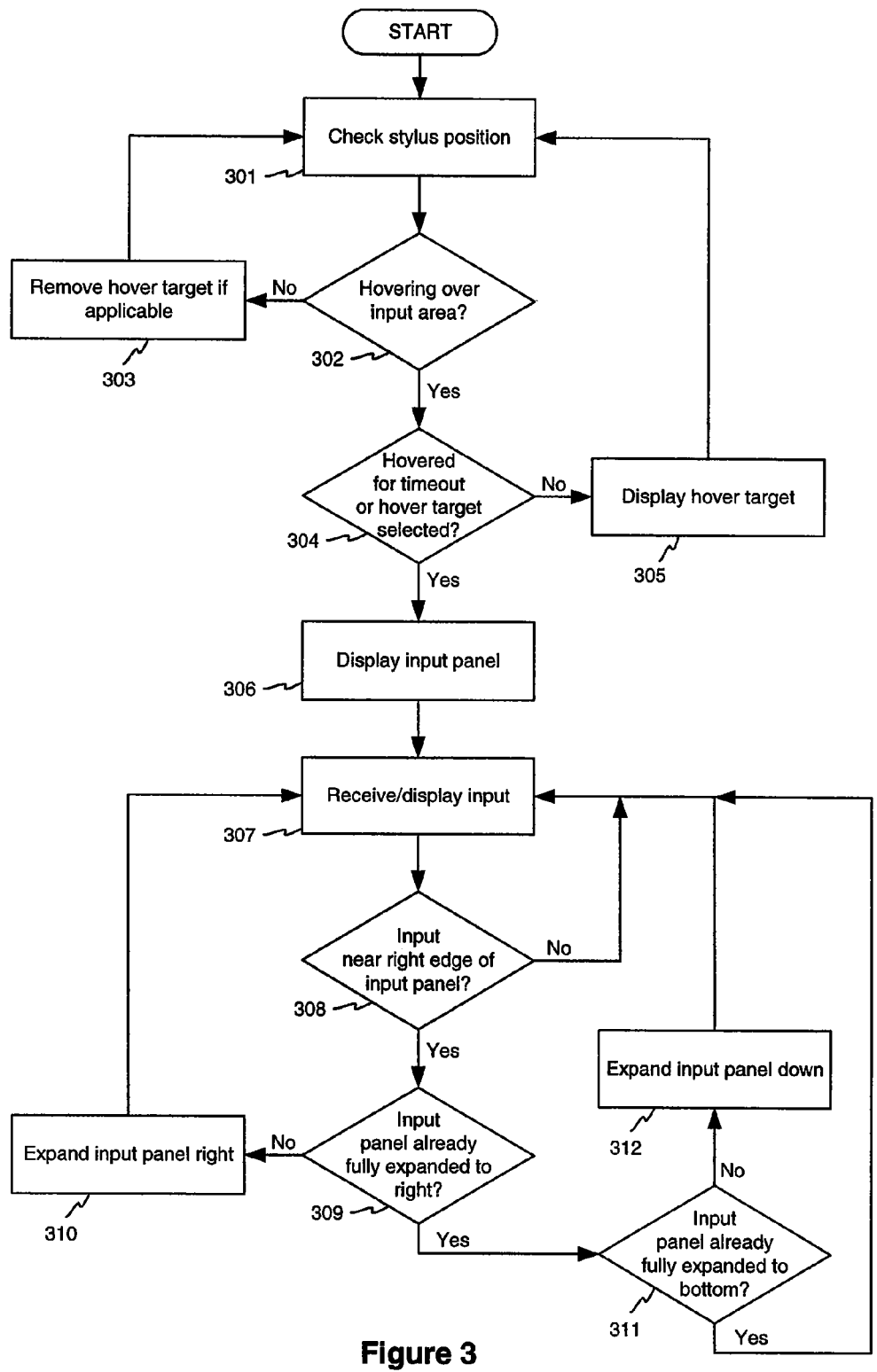
FIG. 3 is a flow chart showing illustrative steps that may be performed in accordance with at least one aspect of the present invention.

Referring to FIG. 3, in step 301, a computer (e.g., computer 100 or 201) may check the position of a user input device (e.g., stylus 166 or 204) relative to an input surface (e.g., digitizer 165 or display surface 202). The user input device will be illustratively considered in the following embodiments to be the stylus 204. However, any user input device may be used, such as the mouse 102. In step 302, the computer may determine, based on the position of the stylus 204, whether the stylus 204 is hovering over the input surface and whether the stylus 204 is hovering over a valid "input area." The term "hovering" means that the stylus 204 (particularly, for example, the tip of the stylus 204) is proximate to, but not physically touching, the input surface. A threshold-based determination may be made. For example, the computer may determine whether the tip of the stylus is within a predetermined orthogonal distance from the input surface. If so, then the stylus is hovering. If not (e.g., the stylus 204 is too far away from the input surface or is touching the input surface), then the stylus 204 is not hovering.

The term "input area" means an area of the display or user input surface that accepts valid user input. At any given time, there may be one or more input areas, and these input areas may change, move, appear, and disappear over time. Which areas are input areas may depend upon which applications are running, which operating system is running, which application(s) has focus (i.e., is the application currently and actively being interacted with by the user), and/or other factors. Input areas typically accept typed text from a keyboard and/or handwritten ink from a stylus. In some embodiments, the only input area may be wherever the "system caret" is currently located, or at least a predefined zone around and near the system caret. A system caret is the insertion point that the user is currently working with. The insertion point may be indicated to the user via a cursor such as a blinking text cursor. Another "cursor" may also exist that indicates the location on the display that the stylus 204 (or other input device such as the mouse 102) is interacting with (e.g., the location on the display over which the stylus 204 is hovering, or the location on the display that the stylus 204 is touching). The cursor indicating the insertion point is not necessarily the same as the cursor indicating the stylus 204 interaction point.

In step 303, if the stylus 204 is not hovering, then any invocation target that may be displayed (as discussed below) is removed from being displayed, the computer then checks again in step 301 whether the stylus 204 is hovering. This loop is repeated until it is determined that the stylus 204 is hovering. Once this occurs, then in step 304 it is determined whether the stylus 204 has either hovered for a predetermined timeout period or whether any displayed invocation target has been selected. The invocation target may be selected by, e.g., clicking on the invocation target such as with a button of the mouse 102, by tapping on the invocation target with the stylus 204, by hovering over the invocation target, or by pressing a button on the computer or the stylus 204. If neither of these determinations occurs, then in step 305, an invocation target is displayed (or is continued to be displayed if already displayed), and the computer continues to check whether the stylus is hovering in steps 301 and 302. The invocation target may be displayed immediately after the stylus has begun hovering over an appropriate area of the input surface or after a time delay. Step 304 may include both a timeout determination and an invocation target selection determination, or it may only include one of these two determinations. Although the present illustrative embodiment is described as displaying the invocation target in response to the stylus 204 hovering, the invocation target may also be displayed in response to other user input, such as in response to the stylus 204 actually contacting the input surface or in response to some other gesture performed by the stylus 204. It will be understood that hovering as discussed herein is presented only as an illustrative user input.

Figure 4:
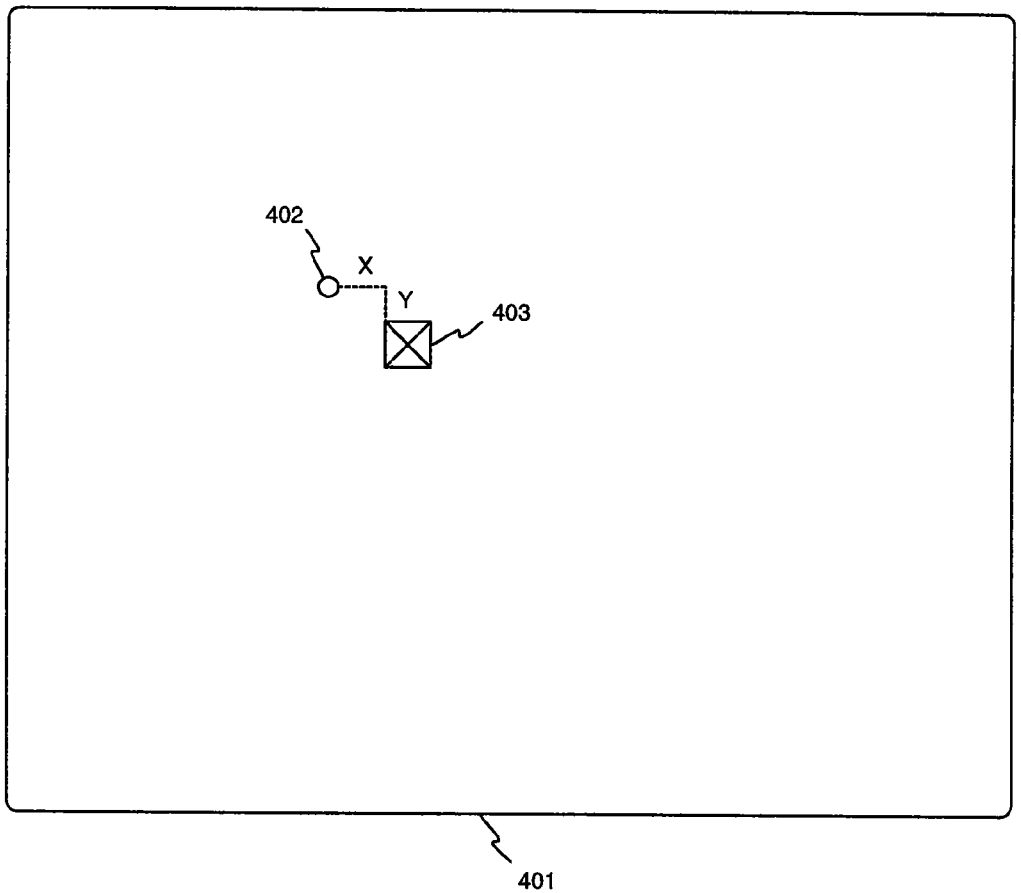
FIGS. 4, 5, 7, and 8 are various screen shots showing how an input panel may expand in accordance with at least one aspect of the present invention.

An "invocation target" is an indication to the user that an input panel is available and can be invoked. The invocation target may be an indication that is visible and/or audible to the user, such as an icon displayed on a display, an audible sound such as a beep or click, or a modified cursor. An example of an invocation target 403 is shown in FIG. 4. The invocation target 403 may be displayed at a predetermined location on a display 401 (which may be part of the input surface), or at a location that depends upon the location 402 on the display 401 over which the stylus 204 is hovering or otherwise interacting with the display 401 (the "interaction point" 402). For example, the invocation target 403 may be displayed at a location that is displaced from the interaction point 402 by a predetermined amount. Alternatively, the invocation target 403 may be displayed at a location that depends upon the location of the insertion point in the active input area. For example, the invocation target 403 may be displayed at a location that is displaced from the insertion point by a predetermined amount. In the shown embodiment, the invocation target 403 is displayed at a location where the edge of the invocation target 403 nearest the interaction point 402 is displaced on the display 401 by X distance in the horizontal direction and by Y distance in the vertical direction, where X and Y may be the same or different and may be negative or positive. It should be noted that in this example, the "X", "Y", and broken lines as shown are not actually displayed but are included only for explanatory purposes. The X and Y distances may be any amount, such as about ¼ of an inch or less, about ⅓ of an inch, or about ½ of an inch or more.

Although the invocation target 403 as shown is a box with an "X" inside, this is merely an example. The invocation target 403 may appear to the user in any form, such as an icon, an animation, an image, text, and/or any other type of visual element(s). Also, although the invocation target 403 is shown as a rectangle, it may be of any shape such as a circle, square, triangle, and/or any other geometric or non-geometric shape.

As discussed above, the user's stylus 204 may hover for the timeout period, or the user may select the invocation target 403. The user may select the invocation target 403 in any of a number of ways, such as by tapping on the displayed invocation target 403 with the stylus 204. In response to either of the actions set forth in step 304 occurring, an input panel is presented to the user in step 306. The input panel is able to receive user input, such as electronic ink input from the stylus 204, typewritten input from a keyboard, and/or other input.

Figure 5:
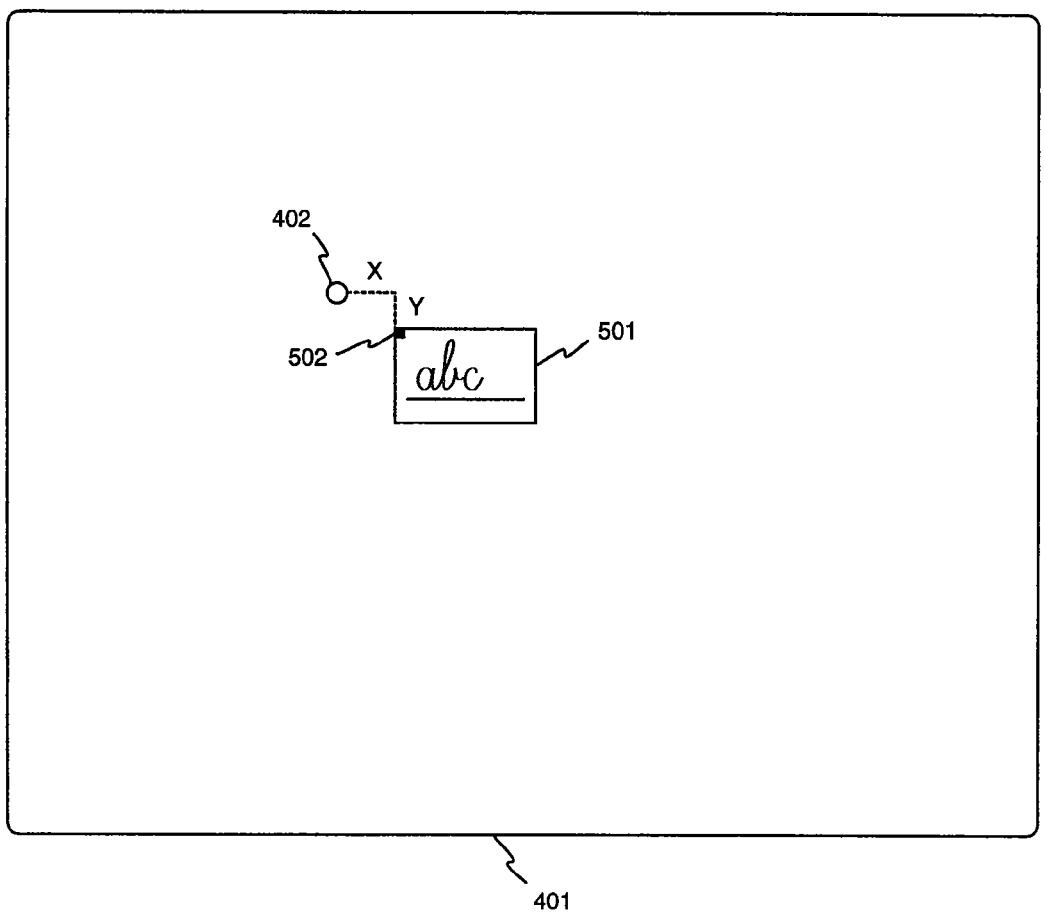

An example of a displayed input panel 501 is shown in FIG. 5. The input panel 501 may replace the invocation target 403 or it may be displayed in addition to the invocation target 403. The input panel may include an anchor point 502, which may or may not be displayed. The input panel 501 may be displayed at any location on the display 401, such as where its anchor point 502 is at a predetermined location or at a location that depends upon the interaction point 402 and/or the location of the invocation target 403. In the example shown, the input panel 501 is displayed in the same, or nearly the same, location as the invocation target 403 that was previously displayed before being replaced by the input panel 501.

Referring back to FIG. 3, in step 307 the input panel 501 may receive as user input any type of content desired, such as text, ink, images, audio (e.g., speech), etc. However, the illustrative input panel 501 in the embodiments disclosed will be considered to be primarily for receiving text, ink, and/or speech content. The reason for this is the input panel 501 may, in certain embodiments, be considered a text input panel for receiving meaningful input for entry into a currently running application such as a word processing application. As can be seen in FIG. 5, the letters "abc" are written in handwritten ink as content in the input panel 501. This may be done by, e.g., using the stylus 204 to write "abc" on the input surface, and more particularly on the portion of the input surface corresponding to the input panel 501.

Figure 6:
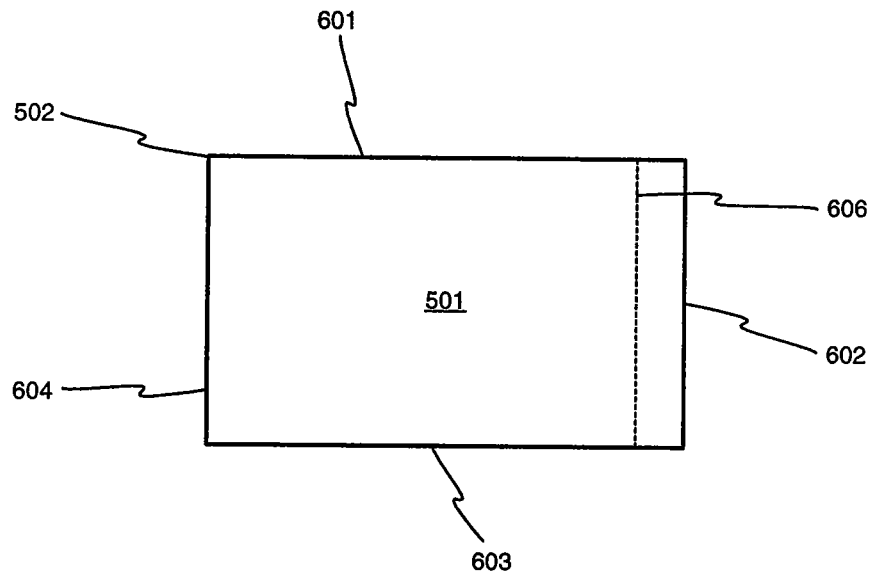
FIGS. 6 and 13 are depictions of illustrative input panels in accordance with at least one aspect of the present invention.

In FIG. 3, in step 308, the computer may check whether the user input is near or touching a boundary of the input panel 501. Boundaries of the input panel 501 may be coextensive with the visible edges of the input panel 501, may be within the visible representation of the input panel 501, and/or may extend beyond the visible representation of the input panel 501. For example, a right boundary may be the same as a right visible edge of the input panel 501, or the right boundary may be a predetermined distance to the left of the right visible edge. FIG. 6 shows an example of a right boundary 606 that is to the left of the right edge 602 of the input panel 501. However, the boundary 606 may also be at the same location as the right edge 602. Also indicated are the top edge 601, left edge 605, and bottom edge 603 of the input panel 501.

Figure 7:
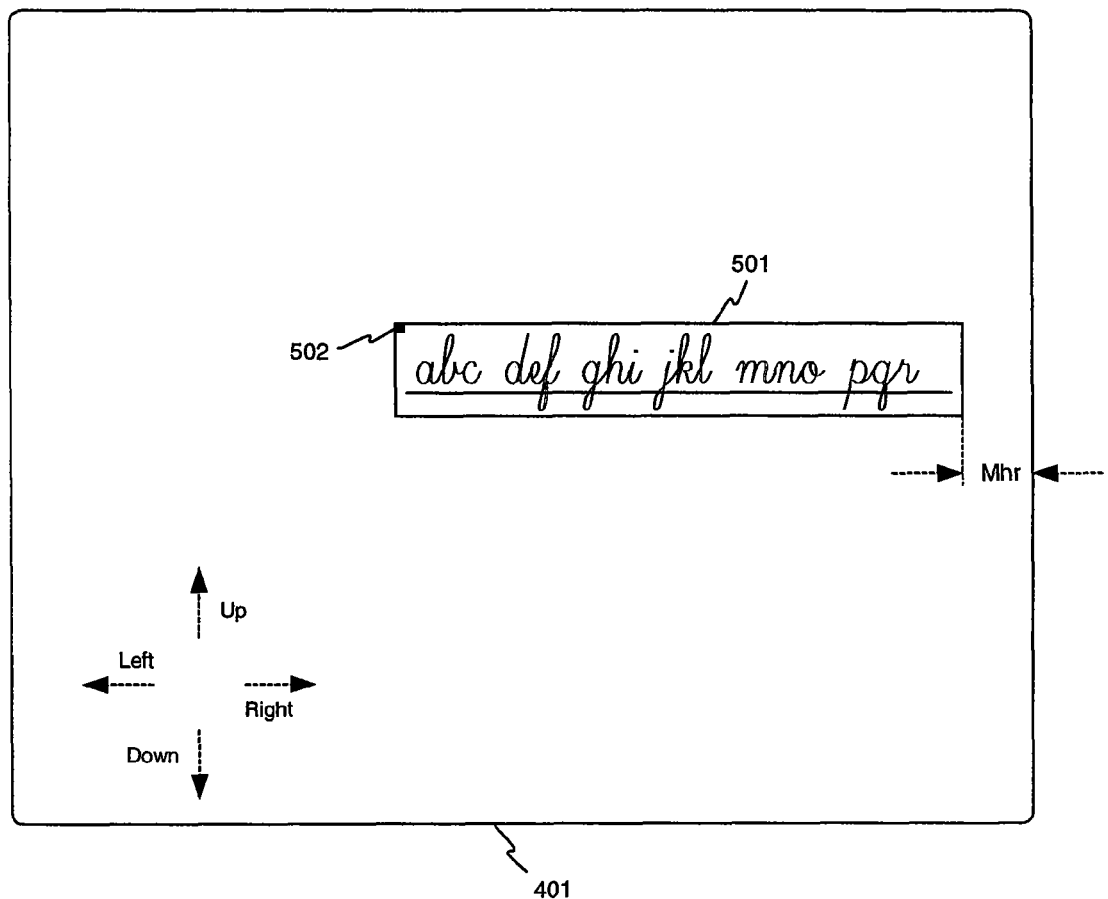

FIG. 7 shows what may occur in response to the user input being near or touches a boundary of the input panel 501. FIG. 7 also shows directions "up," "down," "left," and "right." These illustrative directions will be used consistently throughout the specification to help explain aspects of the invention, and are measured from the user's point of view as the user views the display 401. The directional arrows and direction text as shown are not necessarily displayed on the display 401, but are merely shown for explanatory purposes. The directions as used herein are also relative to the display 401 and are not necessarily relevant to or descriptive of the pull of Earth's gravity. For example, the display 401 may lay horizontally on a table, yet the "up" direction as shown remains the "up" direction relative to the display 401.

As can be seen, the user input, originally "abc", has been changed to now read "abc def ghi jkl mno pqr". Because this user input would not have fit in the input panel 501 as shown in FIG. 5, the input panel 501 automatically expands to accommodate the user input. In this embodiment, responsive to the user input being near or touching a right boundary of the input panel 501, the input panel 501 dynamically expands its right visible side 602 and/or right boundary 606 as necessary to fit the user input. For instance, if the user input had only been "abc def ghi", then the input panel 501 may have expanded rightward less than shown in FIG. 7. In real time, as the user input moves toward the right, the input panel 501 may continue to expand rightward. However, the input panel 501 may be limited as to how much it can expand rightward. A physical limitation would be the boundary of the display 401. The input panel 501 may further be artificially limited in its rightward expansion. For example, the input panel 501 may only be able to expand rightward up to a predetermined horizontal right margin Mhr from the right boundary of the display 401. The margin Mhr may be fixed or variable, and may be set by the user and/or by an application. Margin Mhr may be measured as absolute distance or as a percentage of the size of the display 401. For example, Mhr may be about ¼ inch, about ½ inch, between about ¼ inch and about ½ inch, about 3% of the display 401 boundary width, about 5% of the display 401 boundary width, or between about 3% and about 5% of the display 401 boundary width. However, Mhr may be other values. Throughout the expansion process, the anchor point 502 may remain fixed. This means that the top edge 601 and the left edge 605 of the input panel 501 may also remain fixed throughout the expansion process.

Thus, referring back to FIG. 3, if in step 309 the input panel 501 has not yet fully expanded rightward to its limit, then in step 310 the input panel 501 expands rightward and continues to accept further user input in step 307. The input panel 501 may expand rightward in increments. The increments may be of a fixed size or may vary depending upon the user input. Where the increment size is fixed, the increment may be about 1.5 inches, or about 1.75 inches or about 2 inches, or more or less than these amounts.

Figure 8:
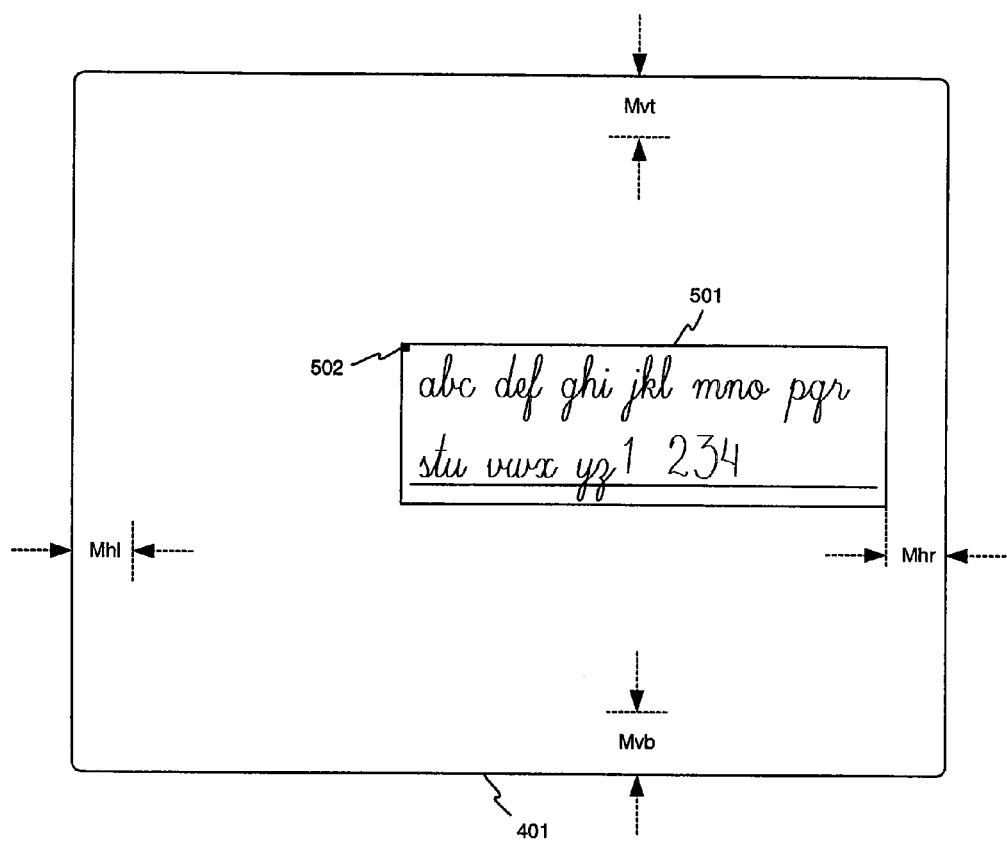

On the other hand, if in step 309 it is determined that the input panel 501 has already reached its rightward limit, then the input panel 501 may expand in another direction in step 312. In the shown embodiment, the other direction is down. The input panel 501 may then continue to accept further user input in step 307. FIG. 8 illustrates what may happen when the input panel 501 has reached its rightward limit and the user continues to provide user input to the input panel 501. In this case, the user input has now increased to become "abc def ghi jkl mno pqr stu vwx yz1 234". This entire user input could not fit in the input panel 501 as shown in FIG. 7, so the input panel 501 has automatically expanded downward to accommodate the additional user input. In other words, the bottom edge 603 of the input panel 501 has moved downward in response to rightward extension of an ink stroke. This rightward and downward expansion of the input panel 501 may occur in real time while the ink is being written. Note that the right margin Mhr is still respected. The downward expansion may begin only after the rightward expansion has cause the input panel 501 to expand fully to the right up to margin Mhr. Alternatively, at least some downward expansion may occur prior the input panel 501 expanding fully to the right, before it expands to margin Mhr. Moreover, at least some downward expansion may occur simultaneously with rightward expansion (which may appear to the user as effectively a diagonal expansion).

However, in the present embodiment, the input panel 501 may expand downward only if it has not yet fully expanded in the downward direction. Thus, in step 311, if the input panel 501 has not yet fully expanded downward, then it may expand in an incremental manner. For example, the input panel 501 may expand by a predetermined increment or by an amount depending upon the user input. In one embodiment, the downward incremental expansion amount may be a fixed amount of about 1.5 inches, or about 1.75 inches or about 2 inches, or more or less than these amounts. In another embodiment, the downward incremental expansion amount may depend upon the vertical size of the handwritten or vertical characters that has been previously written into the user input panel. The larger the previously written text, the larger the downward increment, with the expectation that further user input characters will be of a similar size.

On the other hand, if the input panel 501 has already expanded to a maximum downward limit as determined in step 311, then the input panel 501 may not expand further. However, the input panel 501 may continue to accept user input. The expansion limit in the downward direction may be limited by the bottom boundary of the display 401. The downward expansion limit may further be limited by an artificial vertical bottom margin Mvb. Margin Mvb may be determined in the same manner as margin Mhr.

At this point, it should be noted that the anchor point 502 in this embodiment continues to remain in the same fixed location on the display 401 throughout FIGS.—5, 7, and 8. This is true even though the input panel 501 may have fully expanded in the rightward and/or downward directions. In some embodiments, the user may be able to manually move the anchor point (such as by dragging/dropping it) to make further room for input panel expansion. The anchor point 502 may represent the intersection of the upper and left boundaries of the input panel 501. However, the anchor point 502 may represent the intersection of other boundary combinations of the input panel 501, such as the intersection of the upper and right boundaries of the input panel 501. Returning to the example where the anchor point 502 represents the intersection of the upper and left boundaries, the upper and left boundaries of the input panel 501 may thus remain fixed along with the anchor point 502. Therefore, once the input panel 501 has fully expanded in both the rightward and downward directions, the input panel 501 cannot expand further. As will be discussed further, which intersection of boundaries the anchor point 502 represents may depend upon which language is expected to be written or typed into the input panel 501.

Although the input panel 501 may reach a point where it can no longer expand in any direction (i.e., where the outcome of step 311 is "yes"), the user may continue to add user input and/or edit existing user input in the existing area defined by the input panel 501. Where the input panel 501 can no longer expand, the input panel 501 may in response develop one or more scroll bars in the horizontal and/or vertical directions for allowing still further user input to be entered. However, in some embodiments, it may be desirable to keep the interface with the input panel 501 as simple as possible, and so scroll bars would not become available in that instance.

A horizontal left margin Mhl and a vertical top margin Mvt are also shown in FIG. 8. These margins are artificial margins that may be used such that the input panel 501 cannot cross those margins. In some embodiments, the anchor point 502 can never be located to the left of margin Mhl, nor can the anchor point 502 ever be located above margin Mvt. This would be true regardless of where the interaction point 402 is. Any rules defining where the input panel 502 should be displayed should ensure that the input panel 502 is not located outside of margins Mhl, Mhr, Mvt, and Mvb, both initially and while the input panel 502 expands. If necessary, the initial default location of the input panel 502 that would otherwise be used as described previously may be modified by an amount sufficient to ensure that the input panel 502 does not violate these margins. Whenever the default placement rules do not result in placing the invocation target and/or the input panel within the margins, then the invocation target and/or input panel may be moved as little as possible so as to be as close as possible to the default location without violating the margins.

Input Panel Interaction With Input Areas

Figure 9:
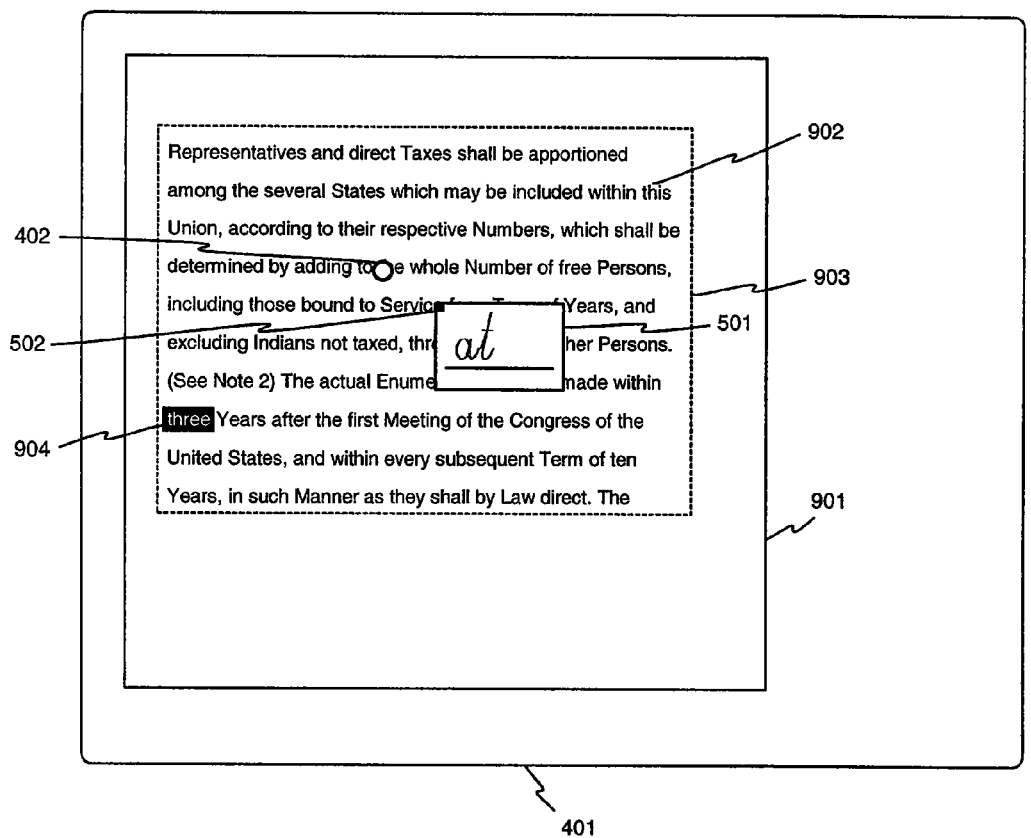
FIGS. 9 through 11 are various screen shots showing how an input panel may be used in connection with an input area in a software application, in accordance with at least one aspect of the present invention.
Figure 10:
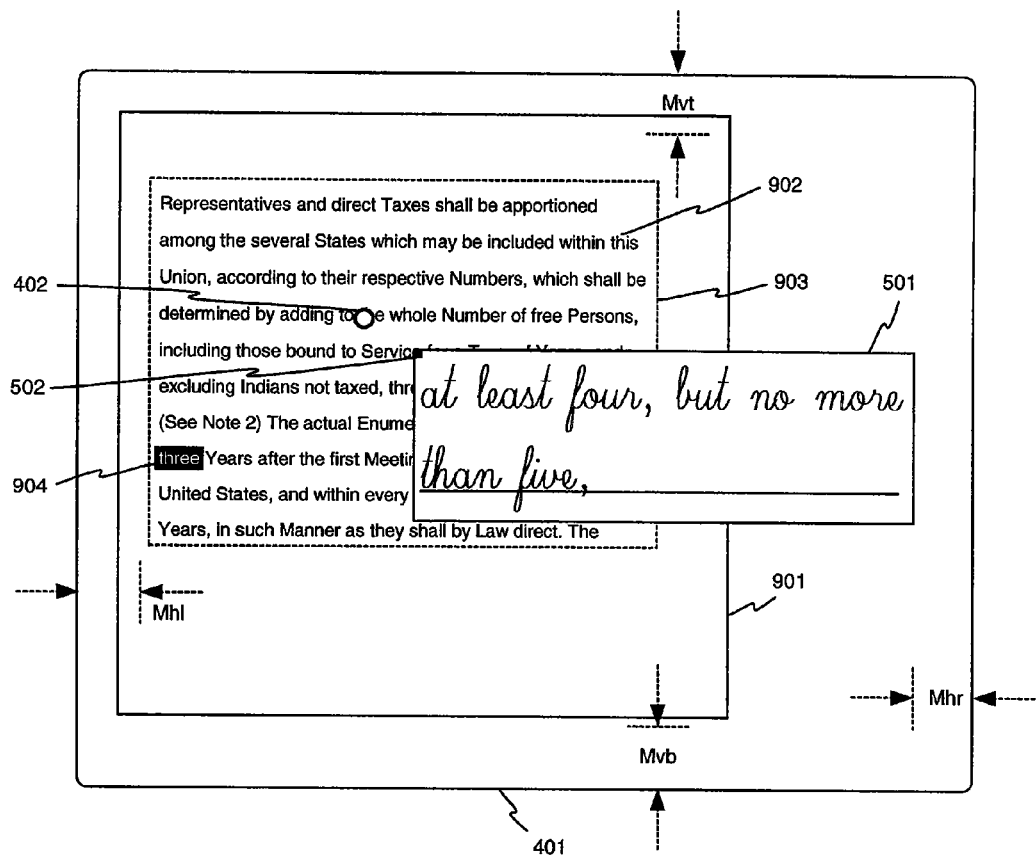
Figure 11:
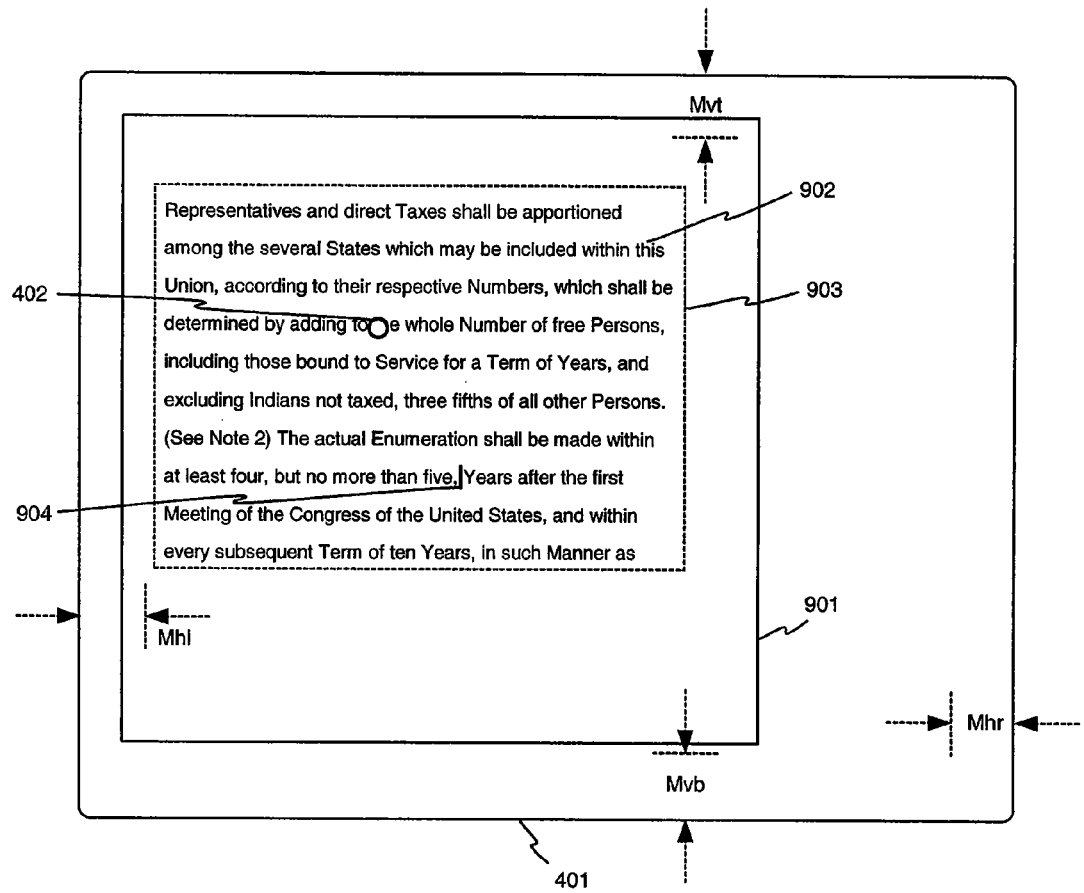

Examples of how the input panel 501 may be used is shown in FIGS. 9 through 11. In FIG. 9, the display 401 shows the graphical user interface representation 901 of an open software application, such as, but not limited to, a word processing application, spreadsheet application, Internet web browser, or an email program. The software application may display content 902, which is text in this example but may be other content. The content 902 may be interacted with, such as by editing, deleting, or adding to it. Therefore, in this particular embodiment, an area 903 on the display 401 (shown by broken lines that are not necessarily displayed) containing the content 902 may be considered an input area as previously defined. The stylus 204 may be hovering over the display 401 in an area indicated by the interaction point 402 (or over a portion of an input surface corresponding with the interaction point 402 on the display 401, where the input surface is not the same as the display 401). Because the interaction point 402 is within the input area 903, an invocation target, and eventually the input panel 501, may be displayed as previously described. Had the interaction point 402 been outside of the input area 903 (and outside of any input area), then an invocation target, and the input panel 501, may not have been displayed. Thus, whether the invocation target and/or input panel are displayed may depend upon where the interaction point 402 is relative to an input area. Input areas may be defined by the operating system and/or by the application software currently running.

In this example, the input panel 501 may be associated with the input area 903 and may initially be empty of user input and content. The input panel 501 may particularly be associated with an insertion point in the input area 903. Typically, the application, or a system hosting the application (such as the operating system), will provide an insertion point where data created by an input device will be inserted into a control such as the input area 903. For example, an application may display an insertion point to indicate where data created by an input device will be inserted. An insertion point for text typically may be displayed as a cursor in the form of a blinking vertical line. The position of the insertion point will conventionally be controlled by one or more input devices. The insertion location may further be a selection of replaceable text. When a user wishes to replace a selection of text with new input data, the user may select the entire text to be replaced. For example, a user may activate a command button associated with a pointing device, and then move the pointing device so that a displayed pointer passes over or through the text to be replaced. This process is sometimes referred to as "blocking" a selection of text. When a user then enters data into the control, the entirety of the selected text is replaced with the newly entered data.

In this example, the user has blocked the word "three" in the content 902, with the intention of editing that word. The selected portion may therefore be considered the insertion point 904 in the input area 903. Any changes that the user makes to the content 902 using the input panel 501 would occur at the insertion point 904. As shown, the user adds handwritten user input "at" to the input panel 501. The insertion point 904 associated with the input panel 501 may be further highlighted or otherwise modified to indicate that it is associated with an input panel.

Referring to FIG. 10, the user continues to write, adding to the "at" previously written, so that the handwritten content in the input panel 501 is now "at least four, but no more than five". As previously described, the input panel 501 may expand rightward, and if necessary downward, to accommodate the user input. Again, the input panel 501 may expand rightward and downward in such a way that it does not violate the Mhr and Mvb margins and that maintains the anchor point 502 in a fixed position. In this example, the anchor point 502 is the upper left corner of the input panel 501. Also, the input panel 501 may initially appear in such a location that does not violate the Mhl, Mhr, Mvt, and Mvb margins.

As shown in FIG. 11, when the user is finished adding user input to the input panel 501, the user input may be transferred to the input area associated with the input panel 501, which in this example is input area 903. In particular, the user input may be transferred to a location within the input area 903 associated with the interaction point 402, which in this case is the insertion point 904 generated by the active software application. The user input may further be converted into another form prior to adding it to the input area 903. For example, where the user input is handwritten ink, the ink may be recognized into text, and the recognized text may be added to the input area 903. As shown, the user's handwriting is recognized, and the resulting text corresponding to the handwriting replaces the highlighted word "three" at the insertion point 904, such that the relevant portion of the content 902 now reads, " . . . within at least four, but no more than five, Years . . . ". After insertion of the recognized user input from the input panel 501, the insertion point 902 is now located after the inserted content, and is shown in the form of a standard text cursor.

Handwriting recognition may be performed automatically or manually at various times as desired. For example, handwriting recognition may be invoked only after the user is done with adding the user input, or automatically while the user is adding the user input. Where recognition is performed while the user is adding input, handwriting recognition may be automatically performed after each character is written or after each word is written. The text resulting from handwriting recognition may be added to the input area 903 while the user is still adding input without waiting for the user to finish, or after the user has finished. Recognition may occur in response to the stylus 204 being lifted off the input surface for at least a certain period. Recognition may alternatively occur in response to a manual command from the user, in response to switching input modes, or and/or in response to switching applications.

There may be exceptions to the rule that the anchor point 502 is fixed. For example, where the insertion point 904 is moved under the input panel 501, the input panel 501 may move a sufficient amount to prevent the insertion point 904 from being hidden from the user. The insertion point may move under the input panel 501 where, for example, the user input handwriting in the input panel 501 is recognized and sent to the input area 903 while the user writes.

Figure 12:
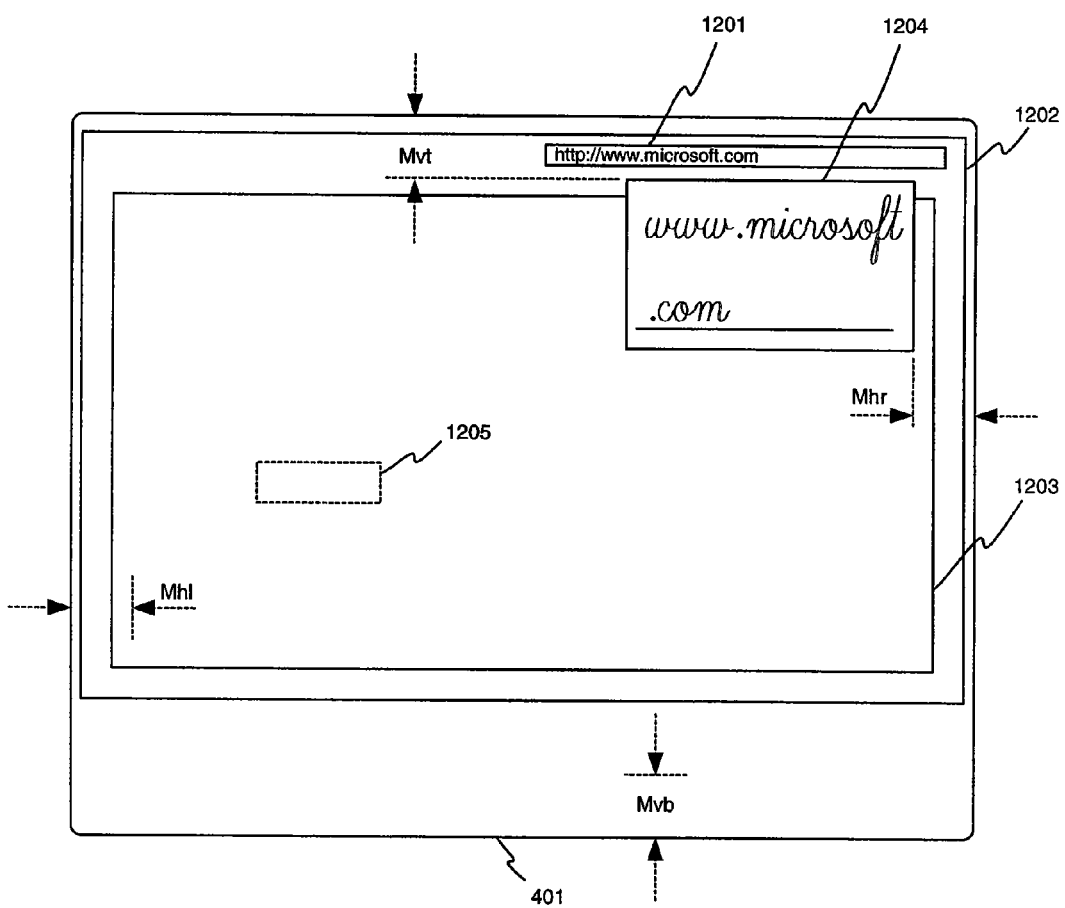
FIG. 12 is a screen shot showing how an input panel may be used in connection with an Internet web browser software application, in accordance with at least one aspect of the present invention.

FIG. 12 illustrates another example of using an input panel in connection with an Internet web browser software application. The browser application may display a browser window 1202, with a content box 1203 in the window for displaying the content of a currently-browsed web page. The browser application may further display an Internet address input box 1201, which may receive user-input Internet addresses such as in the form of universal resource locators (URLs). In this embodiment, the Internet address input box 1201 is an input area for purposes of interacting with an input panel. Another input area 1205 is shown in the content box 1203. The existence and/or location(s) of any input area(s) in the content box 1203 may be defined by and depend upon the particular Internet web page being browsed at any given time. The displayed Internet web page may be considered a document, and in general, any type of document may define the existence and/or location(s) of any input area(s) therein.

If the interaction point (not shown) remains in or near the Internet address input box 1201, then in response an invocation target (not shown) and/or an input panel 1204 may appear. In this example, the hover position may be in the Internet address input box 1201, which is outside the Mvt margin. Therefore, placement rules should ensure that the invocation target and/or the input panel 1204 do not display above the Mvt margin. Depending upon the specific circumstance, the invocation target and/or the initially-displayed input panel 1204 may need to be moved downward by a small amount to ensure this. In addition, the location that the invocation target and/or the input panel 1204 are displayed may be affected by any auto-complete dropdowns that are expected to show. For example, where the Internet address input box 1201 has an auto-complete feature that drops down a list of suggested complete Internet addresses, the invocation target and/or input panel 1204 initial display position may be adjusted to be displayed below where the bottom of the expected dropdown auto-complete list would be displayed.

Also, depending upon how far to the right of the display the interaction point is located, the invocation target and/or the initially-displayed input panel 1204 may need to be moved leftward to ensure that the default initial size of the input panel 1204 does not violate the Mhr margin. The user may write, using the stylus 204, a URL such "www.microsoft-.com". This handwritten URL may be recognized, and the resulting text may be added to the Internet address input box 1201. In response, the web page associated with that URL may be browsed to. Had the interaction point been associated with the input area 1205 (e.g., inside the input area 1205), the resulting user input sent to the input area 1205 may interact with the displayed web page and/or be sent to a remote server providing the displayed web page.

Summoning and Dismissing

Input panels have been described as being summoned by hovering the stylus 204 over an input area. However, an input panel (such as the input panel 501 or the input panel 1204) may be summoned in any of a variety of ways. For example, an input panel may be explicitly summoned in response to a user's commands, such as a keyboard command, menu command, or gesture of the stylus 204. Stylus gestures may include any type of gesture such as hovering, tapping, and/or dragging of the stylus 204 relative to the display 401. An input panel may be summoned with or without a preceding invocation target.

Moreover, input panels have been described as being summoned after an invocation target first appears. However, the invocation target is not necessary; an input panel may be summoned without a prior invocation target. This may be particularly useful where the input area is currently blank (devoid of user input) or is of a certain type. Thus, in some embodiments, an invocation target may normally first appear followed, if summoned, by the input panel, while in certain situations in the same embodiments the input panel may be summoned without the invocation target. For example, the input panel may be immediately summoned in response to the stylus 204 hovering over a blank input area. Or, the input panel may be immediately summoned in response to the stylus 204 hovering over or approaching a blank "To," "From," or "Subject" input area in an email. The input panel that is summoned immediately may differ from the input panel that is summoned after an invocation target is displayed. For example, the input panel that is summoned immediately may be smaller or missing certain elements (such as keyboard buttons, mode switching user interfaces, etc.). This smaller, simpler state may be preferable in such a situation because this smaller, simpler input panel would be an educated guess that the user actually desires to start inputting via the input panel, whereas showing the full input panel in such a situation may be a bit intrusive.

Likewise, an input panel (such as the input panel 501 or the input panel 1204) may be dismissed in any of a variety of ways. For example, an input panel may be explicitly dismissed by a user-invoked keyboard command, menu command, or gesture of the stylus 204. Again, such a gesture may be any type of gesture. Once closed explicitly, the invocation target and/or the input panel may not be automatically displayed again in connection with the same input area or software application. However, if the focus changes or if the stylus 204 is removed from the input surface in the currently-focused input area or application, then automatic invocation of the invocation target and/or input panel may again be performed in connection with that same input area.

In one example of a gesture-based dismissal, if the stylus 204 hovers outside the displayed input panel (or at least a predetermined distance, such as ½ inch, outside a boundary of the input panel), then in response the input panel may be dismissed. A dialogue window may provide the user the opportunity to verify that dismissal is desired. This "hover away" dismissal may always dismiss the input panel, or may only dismiss the input panel if the stylus 204 has already entered the area of the input panel. This may reduce unintended dismissal from occurring. Another example of gesture-based dismissal may be that the input panel is dismissed in response to the stylus 204 going out of range of the input surface. This "out of range" dismissal may always work or may work only if user input has already been provided to the input panel. Again, the latter may help reduce unintended dismissal. The "hover away" dismissal and the "out of range" dismissal may also each require that the stylus 204 be away from the input panel or out of range for at least a minimum timeout. The timeout may be any amount of time, such as about one second or more.

Yet another way to dismiss an input panel is to dismiss the software application and/or input area associated with the input panel. Should this occur, any user input in the input panel not already sent to the software application and/or input area may be flushed and not sent. However, simply changing the focus to another software application or to the shell may not affect the input panel, which may remain open but out of focus until selected again.

Input Panel Content Formats

Figure 13:

Examples of input panels have been described thus far in connection with handwritten user input using a stylus. However, an input panel may accept a variety of user input formats including keyboard input and speech. Depending upon the type of user input desired, the input panel may be displayed in a different form. For example, where freestyle handwriting is desired, the input panel may be blank or may contain a single line on which to write words. Where character-by-character recognition is desired, the input panel may display a series of blocks or the like, one for each character, such as is shown in FIG. 13. As the input panel expands, additional character blocks may be displayed. Where keyboard input is desired, the input panel may display an icon of a keyboard, or even a graphical interactive keyboard that may be used to enter characters. The input panel may include one or more buttons or other controls 1301 allow the user to manually select which type of input panel to display. For example, the buttons 1301 may allow the user to select between keyboard, freestyle handwriting, and character-by-character (block style) content input panels. Alternatively, the user may select the type of input panel content from the invocation target.

Multiple Language Accommodation

Thus far, input panels have been described with the assumption that the user input will be in a language that is written in rows from left to right and then those rows are written from top to bottom, such as English. In that case, it is desirable that the input panel expands rightward and then downward to match the way that English is written. However, not all languages are written in this manner. For example, Hebrew is written in rows from right to left and then those rows are written from top to bottom, and traditional Chinese is written from top to bottom in columns and then those columns are written from right to left. Therefore, it may be desirable that the input panel expands in different directions than as previously described. For example, where the user is writing in Hebrew, the input panel may first expand leftward until it reaches the Mhl margin, and then downward as needed for each row until it reaches the Mvb margin. The right and top edges of the input panel would remain fixed, and the anchor point may be the intersection of the right and top edges. Also, in the case of Hebrew boundary 606 may be a left boundary. Or, where the user is writing in Chinese, the input panel may first expand downward until it reaches the Mvb margin, and then leftward as needed for each column until it reaches the Mhl margin. The right and top edges of the input panel would again remain fixed. To generalize, the input panel may expand in two out of the four possible directions, and remain fixed in the other two directions.

The particular language being used may depend upon the context in which the input panel is created, upon user commands, upon the operating system, upon the input area associated with the input panel, and/or upon the software application currently in focus. The buttons 1301 may further allow the user to manually choose the language. The language may further be chosen through interaction with the invocation target. Both the manner in which the input panel expands and the manner in which the user's handwriting is recognized may depend upon the language chosen.

Conclusion

Thus, a useful and convenient way to add user input in stylus-based and other computer systems has been described. An input panel is described that may dynamically expand in an on-demand manner that is particularly effective for receiving written or typed user input. The input panel may provide easy access to written or typed user input when and where needed by the end user, while reducing or minimizing the amount of valuable screen "real estate" used and reducing or eliminating the possibility of obscuring other elements displayed by the operating system and software applications.

While apparatuses and methods as described herein embodying various aspects of the present invention are shown by way of example, it will be understood that the invention is not limited to these particular embodiments. Modifications may be made by those skilled in the art, particularly in light of the foregoing teachings. For example, one or more of the elements of the aforementioned embodiments may be utilized alone or in combination with one or more elements of the other embodiments. Also, although portions of the disclosure are described in connection with Microsoft WINDOWS brand operating systems, it should be understood that other operating systems may be used, such as other graphical user interface-based operating systems. In addition, the invention has been defined using the appended claims, however these claims are also illustrative in that the invention conceived of includes elements and steps described herein in any combination or sub combination. It will also be appreciated and understood that modifications may be made without departing from the true spirit and scope of the invention.

What is claimed is:

1. In a computer, a method comprising the steps of:
   displaying an input panel on a display, the input panel comprising a first and a second boundary defining a height of the input panel, the first and second boundaries both extending along a first axis, wherein the input panel further comprises a third and a fourth boundary defining a width of the input panel, the third and fourth boundaries both extending along a second axis, wherein the second axis is perpendicular to the first axis;

receiving, by a touch-sensitive interface, user input into the input panel, the user input being entered along the first axis;

moving a position of the fourth boundary away from the third boundary to expand the width of the input panel as the user input is received;

determining that the position of the fourth boundary satisfies a predetermined margin, which is defined based at least partially on a boundary of the display;

upon determining that the position of the fourth boundary satisfies the predetermined margin automatically expanding the input panel along the second axis by moving a position of the first boundary away from the second boundary to expand the height of the input panel;

determining that the position of the first boundary satisfies another predetermined margin; and automatically incorporating a scroll bar into the input panel when it is determined that the other predetermined margin is satisfied.

2. The method of claim 1, wherein the first axis is a horizontal axis, and the second axis is a vertical axis.

3. The method of claim 1, wherein the first axis is a vertical axis, and the second axis is a horizontal axis.

4. The method of claim 1, wherein the input panel expands along the second axis in only a single direction.

5. The method of claim 1, wherein the predetermined margin is based on a distance between the predetermined margin and the boundary of the display.

6. The method of claim 1, wherein the predetermined margin is approximately equal to the boundary of the display.

7. The method of claim 1, wherein moving the position of the fourth boundary is triggered when the user input reaches another boundary that is inside the input panel and is between the user input and the fourth boundary.

8. The method of claim 1, wherein the step of expanding the input panel along the second axis responsive to determining that the fourth boundary is at the selected input panel expansion margin from the edge of the display includes expanding the input panel downward responsive to the input extending rightward.

9. The method of claim 1, wherein the step of expanding the input panel along the second axis responsive to determining that the fourth boundary is at the selected input panel expansion margin from the edge of the display includes expanding the input panel leftward responsive to the input extending downward.

10. A computing-system memory storing computer-executable instructions for performing a method comprising the steps of:

displaying an input panel the input panel comprising a first and a second boundary that define an approximate height of the input panel, the first and second boundaries both extending along a first axis, wherein the input panel further comprises a third and a fourth boundary that define an approximate width of the input panel, the third and fourth boundaries both extending along a second axis, wherein the second axis is perpendicular to the first axis;

receiving user touch input into the input panel, the user touch input being entered along the first axis;

determining that a portion of the user touch input is near the fourth boundary;

automatically expanding the input panel responsive to determining that the portion of the user touch input is near the fourth boundary, wherein the input panel is expanded along the first axis by extending expanding the first and second boundaries and moving a position of the fourth boundary further apart from the third boundary;

determining that the position of the fourth boundary satisfies a predetermined margin when the input panel is automatically expanded, wherein the predetermined margin is defined based at least partially on a boundary of the display;

upon determining that the predetermined margin is satisfied discontinuing expansion of the input panel along the first axis and automatically expanding the input panel along the second axis by moving a position of the second boundary to expand the height of the input panel;

determining that the position of the second boundary satisfies another predetermined margin; and automatically incorporating a scroll bar into the input panel when it is determined that the other predetermined margin is satisfied.

11. The media of claim 10, wherein the predetermined margin is based on a distance between the predetermined margin and the boundary of the display.

12. The media of claim 10, wherein the, wherein the predetermined margin is approximately equal to the boundary of the display.

13. A computing device having:

a processor that is coupled to a memory device, which stores computer-executable instructions; and a touch-sensitive interface, wherein the processor reads the computer-executable instructions to facilitate operations of the touch-sensitive user interface comprising:

displaying an input panel, the input panel comprising a first and a second boundary defining a height of the input panel, the first and second boundaries both extending along a first axis, wherein the input panel further comprises a third and a fourth boundary defining a width of the input panel, the third and fourth boundaries both extending along a second axis, wherein the second axis is perpendicular to the first axis;

receiving, by the touch-sensitive interface, input entered into the input panel, the user input being entered along the first axis;

moving a position of the fourth boundary away from the third boundary to expand the width of the input panel as the user input is received;

determining that the position of the fourth boundary satisfies a predetermined margin, which is defined based at least partially on a boundary of the display;

upon determining that the position of the fourth boundary satisfies the predetermined margin, automatically expanding the input panel along the second axis by moving a position of the second boundary to expand a height of the input panel;

determining that the position of the second boundary satisfies another predetermined margin; and automatically adding a scroll bar into the input panel when the other predetermined margin is satisfied.

* * * * *